(12) United States Patent
Asghar et al.

(10) Patent No.: US 8,045,453 B2
(45) Date of Patent: Oct. 25, 2011

(54) METHODS AND SYSTEMS FOR ALLEVIATING CONGESTION IN A CONNECTION-ORIENTED DATA NETWORK

(75) Inventors: Naeem Asghar, Fort Lee, NJ (US); Randeep S. Bhatia, Green Brook, NJ (US); Rakesh Chandwani, Freehold, NJ (US); Colin Corcoran, Jr., Slidell, LA (US); Fang Hao, Morganville, NJ (US); Joseph Karwisch, Acworth, GA (US); Pramod V. N. Koppol, Manalapan, NJ (US); Tirunell V. Lakshman, Morganville, NJ (US); Michael P. Siesta, West Milford, NJ (US); Stephen M. Zlatos, Manassas, VA (US)

(73) Assignee: Alcatel Lucent, Paris (FR)

( * ) Notice: Subject to any disclaimer, the term of this patent is extended or adjusted under 35 U.S.C. 154(b) by 1591 days.

(21) Appl. No.: 11/139,692

(22) Filed: May 31, 2005

(65) Prior Publication Data

US 2006/0159021 A1    Jul. 20, 2006

Related U.S. Application Data

(60) Provisional application No. 60/645,573, filed on Jan. 20, 2005.

(51) Int. Cl.
    *H04L 12/26* (2006.01)
(52) U.S. Cl. ........................................ 370/229
(58) Field of Classification Search .................. None
    See application file for complete search history.

(56) References Cited

U.S. PATENT DOCUMENTS

| | | | |
|---|---|---|---|
| 6,304,639 B1* | 10/2001 | Malomsoky et al. | 379/112.04 |
| 6,493,317 B1* | 12/2002 | Ma | 370/237 |
| 6,996,065 B2* | 2/2006 | Kodialam et al. | 370/238 |
| 2002/0036987 A1* | 3/2002 | Garcia-Luna-Aceves et al. | 370/238 |
| 2002/0083174 A1* | 6/2002 | Hayashi et al. | 709/225 |
| 2002/0145982 A1* | 10/2002 | Talpade et al. | 370/253 |
| 2002/0186658 A1* | 12/2002 | Chiu et al. | 370/237 |
| 2003/0076840 A1* | 4/2003 | Rajagopal et al. | 370/395.21 |
| 2003/0165137 A1* | 9/2003 | Soloway et al. | 370/389 |
| 2004/0042402 A1* | 3/2004 | Galand et al. | 370/237 |
| 2004/0081092 A1* | 4/2004 | Rhee et al. | 370/230 |
| 2004/0184483 A1* | 9/2004 | Okamura et al. | 370/477 |
| 2006/0159021 A1* | 7/2006 | Asghar et al. | 370/237 |
| 2008/0144661 A1* | 6/2008 | Ali | 370/468 |

OTHER PUBLICATIONS

B. Dorling, J. Burger, D. Freedman, and C. Metz, Internetworking over ATM: An Introduction, 1$^{st}$ ed., Prentice Hall PTR, Upper Saddle River, NJ, 1996.

N. K. Nithi, C.J. Nuzman, B. Y. C. Tang, "Capacity Recovery and Efficient Capacity Deployment in Switching Centers," Bell Labs Tech J., 9:4 (2004).

R. O. Onvural, Asynchronous Transfer Mode Networks: Performance Issues, 2$^{nd}$ ed., Artech House, Boston, MA, 1995.

\* cited by examiner

*Primary Examiner* — Kwang B Yao
*Assistant Examiner* — Juvena Loo
(74) *Attorney, Agent, or Firm* — Capitol Patent & Trademark Law Firm, PLLC

(57) ABSTRACT

Congestion in connection-oriented data networks is alleviated by simulating the rerouting of circuits to uncongested parts of the network and then rerouting such circuits in a manner that causes little, or no, disruption to other parts of the network.

25 Claims, 3 Drawing Sheets

METHODS AND SYSTEMS FOR ALLEVIATING CONGESTION IN A CONNECTION-ORIENTED DATA NETWORK

CONTINUING APPLICATION DATA

The benefit of priority under 35 U.S.C. §119(e) is claimed on U.S. Provisional Application 60/645,573 filed Jan. 20, 2005, the entire contents of which are hereby incorporated by reference.

BACKGROUND OF THE INVENTION

From telecommunications to financial services, network planners and managers must make the best use of their existing network assets and strategically plan for the future.

As a network changes, the traffic carried on the network may exceed its capacity. As a result, the network may develop hot spots and congestion points (sometimes collectively referred to as "congestion") causing service to the network's customers to degrade. Furthermore, such a mismatch in traffic load versus capacity may limit the number of new customers that a network can attract and add.

Accordingly, it is desirable to provide methods and systems for detecting such mismatches in order to alleviate congestion. It is also desirable to provide methods and systems that modify traffic flows to reduce the negative effects of such mismatches while causing little or no disruption to the operation of a network or the services it offers.

SUMMARY OF THE INVENTION

We have recognized that methods, and corresponding systems, may alleviate congestion in a connection-oriented network by, among other things, simulating the operation of a network using so-called greedy heuristic processes.

More particularly, such a method may comprise: collecting data from control and management sections of a network using a "peering" server; and simulating the network's online routing of data offline and identifying one or more congested trunks from the simulations to alleviate congestion based on results of a greedy heuristic process using an "optimization" server.

BRIEF DESCRIPTION OF EXEMPLARY DRAWINGS

DETAILED DESCRIPTION OF THE INVENTION, WITH EXAMPLES

In a connection-oriented network (e.g., an ATM, Multi-Protocol Label Switching [MPLS] network, etc.), connections are dynamically routed by a switch or router upon arrival, subject to approval by a call admission control (CAC) algorithm. A path selection scheme is employed at the ingress of a switch to determine the path to which network resources are to be allocated to handle the incoming connections.

Existing connection-oriented networks sometimes become inefficient (from a capacity standpoint) because of the path selection scheme being utilized and the limited amount of online routing information available. Specifically, it is possible that connections may be provisioned on overused trunks, even though the network has enough capacity to support the connections with little or no congestion.

The present invention provides methods and systems (e.g., platforms) for detecting such inefficiencies and modifying a network to re-route traffic as needed in order to improve network performance. The methods and systems provided by the present invention may be used in a wide variety of connection-oriented data networks, such as a frame relay (FR)/ATM network or MPLS network.

In general, FR/ATM networks are flexible enough to support services of various QoS classes. Some of the commonly supported QoS classes include: Constant bit rate (CBR), variable bit rate (VBR), unspecified bit rate (UBR), and available bit rate (ABR).

Figure 1:
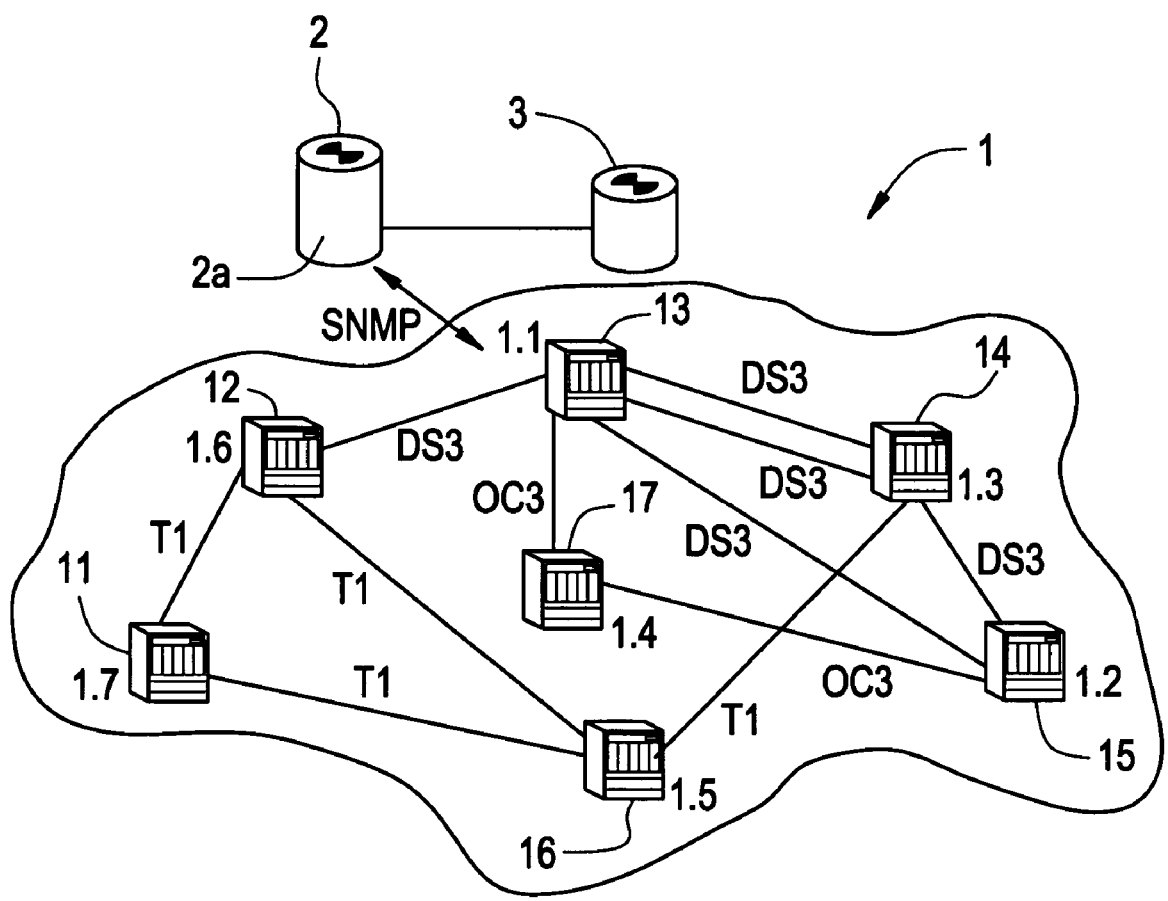
FIG. 1 depicts an example of a frame relay, asynchronous transfer mode network (ATM).

A FR/ATM network guarantees these service classes by carefully selecting paths and by allocating appropriate resources to switches and trunks on a selected path or virtual circuit (VC). FR/ATM networks also offer a variety of means for service providers to structure their services so as to optimize the overall usage of a network. An example of an FR/ATM network is shown in FIG. 1.

The FR/ATM network 1 includes a network management system (NMS) 2. A network operator uses the NMS 2 to operate, provision, monitor and manage the FR/ATM network 1. A provisioning component or server 2a of the NMS 2 is used to configure network parameters and to provision Permanent Virtual Circuits (PVCs). The NMS 2 may be operable to access static information about the network 1 that is contained in a database 3.

Prior to discussing the novel methods and systems provided by the present invention further, it may be helpful to the reader to provide some additional information concerning the routing of traffic over connection-oriented networks.

The use of shortest-path-based routing and the choice of so-called oversubscription factors may result in congestion in parts of a network, even if the network has ample spare capacity. Network congestion may most seriously affect UBR traffic, the predominant type of traffic accounting for up to 70 percent of all traffic on a data network (e.g., Internet Protocol [IP] and digital subscriber line [DSL] networks).

UBR traffic fills transmission links to their engineering capacity. This allows a service provider to maximize its revenue by adding low-priority customers without jeopardizing the QoS of higher-paying customers with service guarantees. A UBR class of service is potentially the best alternative for offering low-cost data services, such as Internet/intranet access and non-critical data transfer. Although these data services (e.g., DSL) are not explicitly provisioned with any QoS guarantees, a certain minimum service quality is expected to ensure customer satisfaction and reduce customer turnover.

UBR traffic in an FR/ATM network is provisioned with zero or minimal equivalent or effective bandwidth (i.e., a minimum bandwidth needed to effectively serve a connection) using large buffers. UBR traffic is provisioned such that only that bandwidth which is not reserved by other QoS classes is used. It allows bursting of cells up to the access rate and delivers cells as long as none of the queues along the path overflows. This implies that there is no limit (other than the access rate) on how much traffic can be sent on a UBR connection, even though there are no resources reserved in a network for the connection. As a result, a switch's queues overflow and then UBR cells/packets are dropped.

It is possible for CBR and VBR services to consume all of a trunk's bandwidth, effectively "starving" UBR traffic of bandwidth (i.e., no bandwidth left for routing UBR traffic). Such a scenario may jeopardize the viability of a UBR service. It is, therefore, important to pre-allocate fixed amounts of bandwidth to UBR services on each trunk.

The amount of bandwidth to pre-allocate to a given trunk depends on several factors, including the estimated, average UBR traffic on the trunk, the trunk's physical bandwidth, the percentage of VBR and CBR traffic expected on the trunk, and the oversubscription of the trunk for VBR services. Many of these parameters are difficult to determine in advance because they depend on future demand and are intertwined with the administrative costs and oversubscription factors of other trunks in the network. Consequently, static allocation of bandwidth for UBR services (although important) is not the norm in service provider networks.

In service provider FR/ATM networks, both detecting congestion and solving problems caused by it may be expensive and tedious.

For example, in general, UBR packet cell losses are not recorded or reported to an NMS because there are no traffic contracts that a service provider must honor. Moreover, some switches do not have the capability of counting UBR cell losses. Even when switches do have this capability, it is often not practical for a switch to poll each of its interfaces to detect congestion because such polling creates an excessive load on the switch's processor and takes up precious bandwidth. As a result, a degradation in service caused by such cell losses may only be observed by end users. In fact, it is typically reported to a service provider only indirectly and often requires on-demand trouble-shooting.

In order to lower the costs related to such on-demand troubleshooting, network operators would like to be able to monitor their network(s) on a regular basis to detect congestion before, or as soon as, it becomes a problem. Such monitoring is made more difficult by the absence of existing, effective techniques for detecting such congestion non-intrusively (i.e., without causing unnecessary degradation in the performance of a network's elements or the services provided by the network). In addition, because the number of provisioned circuits involved in offering services can exceed a million, detecting which circuits are suffering cell losses and causing congestion can typically only be accomplished by subjecting the network to extensive polling loads. Moreover, because of the large number of circuits and the constant rebalancing of circuit paths, such paths are generally not recorded in any external entity (e.g., an NMS). Hence, they are not available (without extensive Simple Network Management Protocol [SNMP] queries) for offline analysis in order to detect congestion.

There exists many different ways to alleviate congestion, including expanding the network (i.e., adding bandwidth), tuning administrative costs and modifying trunk oversubscription factors. However, none of these existing methods is very effective unless care is taken in deciding what changes to make. Changes must be made with a thorough understanding of the interplay between administrative costs, oversubscription factors, bandwidth, and the CAC used. Moreover, effective methods for alleviating congestion must not disrupt services that have been provisioned and provided to end users. For example, methods that require bringing down a trunk are disfavored because they result in mass rerouting of services provisioned on the affected trunk. This may also cause those services to be in violation of their guaranteed contracts, especially if they are rerouted to a part of the network that is experiencing even worse congestion.

With these concepts in mind, the present invention provides methods and systems for detecting congestion and modifying a network to alleviate such congestion.

One way of alleviating congestion is by rerouting the affected services away from hot spots and into parts of a network that has ample spare capacity. However, this is difficult to do because of the nature of existing rebalancing/routing algorithms typically used in connection-oriented networks like FR/ATM networks.

In order to deal with network failures and to ensure that service is restored quickly, routing algorithms continuously monitor a network to identify better paths to use for provisioned services and for rerouting connections whenever better paths are identified or become available. Though such rerouting is a useful feature of connection-oriented networks like FR/ATM, it also makes it difficult to reroute a service to alleviate congestion because existing routing algorithms tend to bring the rerouted service back to its original congested state. Circumventing such an online routing algorithm in order to alleviate congestion is a challenging problem. That said, the present invention provides solutions to just such a problem.

In one exemplary method of the present invention, a limited amount of network data is collected from both the control plane (i.e., section) and management plane of a network. Data from the control plane is obtained in real time by non-intrusive peering (i.e., the exchange of regular control plane protocol messages) with the control plane. Alternatively, the present invention can also make use of other available measurements/data related to congestion, cell losses, network throughput, and usage patterns. Thereafter, the data is analyzed offline by simulating a network's online routing to detect hot spots in the network and to generate a set of recommendations for alleviating congestion. These recommendations include identifying a set of candidate trunks that should be "ballooned" (i.e., prevented from accepting new connections) and a set of circuits that must be rerouted off the congested trunks into parts of the network that have ample capacity to spare. The present invention provides a novel "angioplasty" technique for implementing the proposed changes to a network in a controlled fashion that does not cause significant disruption of existing services. The techniques provided by the present invention circumvent on-board rebalancing/routing algorithms by ensuring that the newly selected paths are the best choice for a routing algorithm in a modified network. In summary, methods and systems provided by the present invention include the following novel techniques:

Techniques for non-intrusively detecting congestion in service providers' networks in real time.

Techniques for computing the minimum required changes to a network to alleviate congestion.

Techniques for implementing the changes with minimal disruption to existing services.

The methods and systems incorporating the above outlined techniques may be designed to work with ATM networks and extended to work with other connection-oriented data networks, such as MPLS. The angioplasty technique can also be used on its own for freeing up redundant equipment or replacing old equipment with minimal network disruption.

We now present an overview of the above-listed techniques followed by a more detailed discussion of each.

Figure 2:
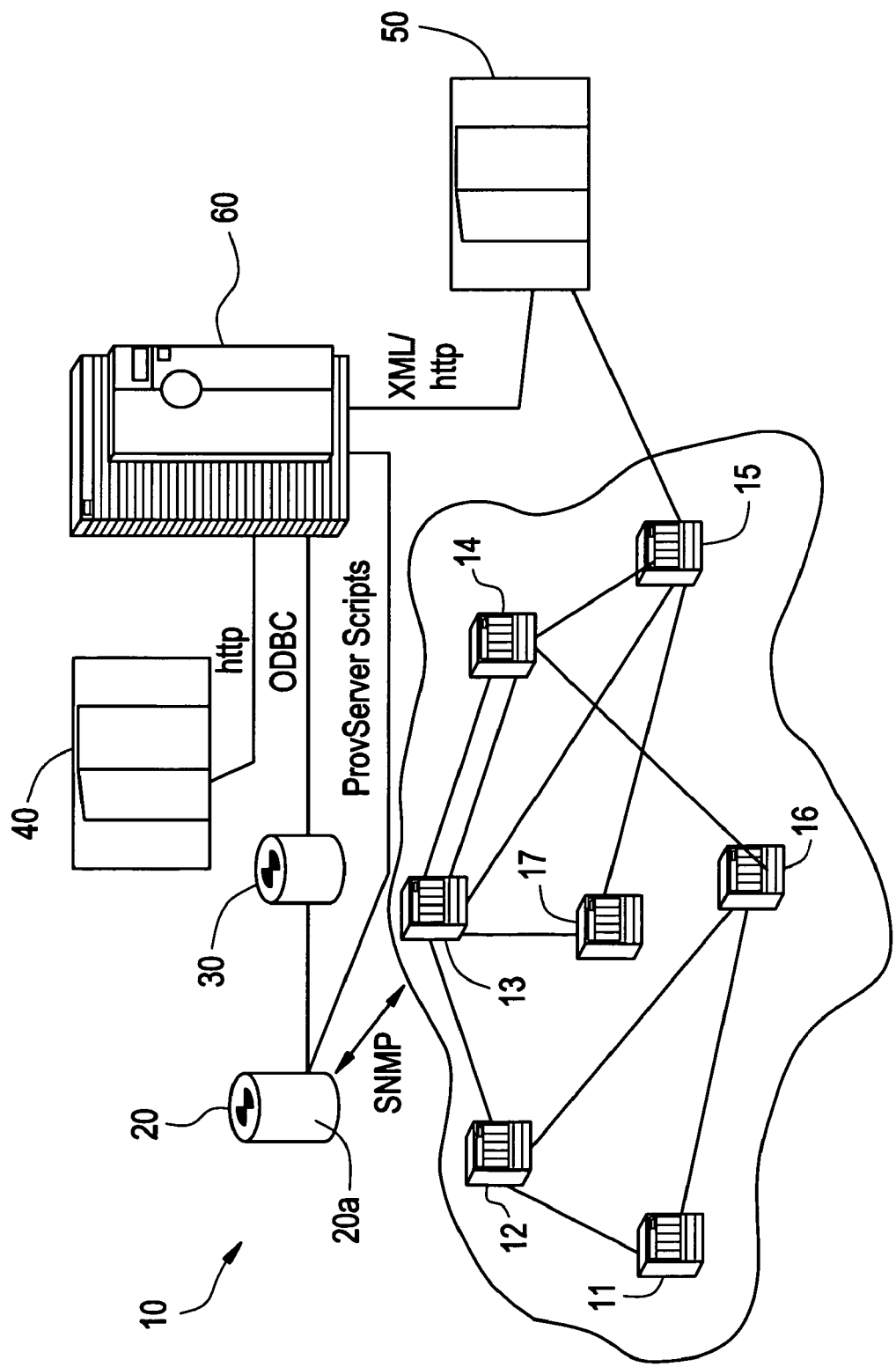
FIG. 2 depicts a block diagram of elements of a system for alleviating congestion in a connection-oriented network according to embodiments of the present invention.

FIG. 2 depicts elements of a connection-oriented network 10. The network 10 may consist of various ATM and FR switches 11-17 (e.g., Lucent Technologies Inc. CBX 500©, GX 550©, and B-STDX 9000© models). The network 10 may be managed by an NMS 20 (e.g., Lucent Technologies Inc. Navis© management system) which typically consists of a provisioning server 20*a* (e.g., NavisCore©), and a database server 30. A web server (e.g., LWS server) 40 is used to collect trunk information, such as trunk endpoints and types and the number of circuits routed on each trunk. A peering server (e.g., Lucent Technologies, Inc. iPeer server) 50 collects real-time, network routing state information by peering with one of the switches in the network. An optimization server (e.g., Lucent Technologies Inc. iOptimize© server) 60 uses information from all these sources to analyze the state of the network and generate optimization recommendations. Once a network operator decides to implement a recommendation, the provisioning server 20*a* is operable to perform the desired rerouting. The following are the basic steps in an exemplary process of the present invention.

Data Collection Examples

The process of collecting data is designed to minimize the load on the network. In one embodiment of the present invention, the database server 30 is operable to store all of the static configuration information (e.g., switch names and addresses, logical port information, and circuit endpoints, types, and bandwidth), so that this information can be obtained using Sequential Query Language (SQL) queries which do not have any impact on the network. Dynamic (i.e., real time) network information (e.g., switch and trunk status and residual bandwidth on each trunk) is available from the peering server 50. It should also be noted that the peering server 50 does not add much overhead to the network because it maintains peering with just one switch and only injects one link state advertisement (LSA)—for the peering link—into the network. To minimize its impact on the network, this peering can be set up at the least-loaded switch in the network. Continuing, the web server 40 is operable to collect dynamic trunk information (e.g., the number of circuits on each trunk) by querying the management information base (MIB) of each switch. However, because such information is collected once from each switch for each optimization and because the amount of information is small, the process is not expected to require much overhead. Another input is the average data rate on a UBR circuit, which can be obtained from the service provider or by sampling UBR circuits across the service provider's network. Such sampling is a one-time event and can be done at a slow pace to avoid placing undue loads on a network.

Exemplary Analysis and Recommendation Generation

After gathering network-state and traffic-demand information, the optimization server 60 is operable to simulate routing. Based on the results of these simulations, residual bandwidth information from the peering server 50, and a circuit count from the web server 40, the optimization server 60 is operable to produce a list of congested trunks (categorized as hot and semi-loaded trunks) and generate a set of recommendations for rerouting of a certain number of circuits from the hot trunks to alleviate congestion, while ensuring that the rerouted circuits avoid the semi-loaded trunks. The set of circuits to be rerouted and the order of rerouting are determined by a greedy heuristic process carried out by the optimization server 60 that ranks the circuits based on their effectiveness in alleviating congestion. The process of ranking involves balancing the benefit of taking a circuit off a congested trunk against the impact that rerouting it will have on the newly selected trunks. New paths for the rerouted circuits are also determined in this step.

An Exemplary Implementation in a Network

Once a network operator decides to implement a recommendation, the provisioning server 20*a* is operable to carry out rerouting in a controlled manner so that the network operator can interrupt, stop, or reverse it at any time if an unexpected event occurs.

It is a non-trivial problem to reroute a number of circuits away from a hot trunk. One solution would be to use a defined or explicit path, which tells a source switch the exact path for a circuit. There are two problems with this approach. First, there are limits on the number of defined paths that can be stored on a switch or line card. Second, in the event of a failure, defined paths are often unprotected because a virtual network does not reroute or rebalance them when such a failure occurs.

To avoid these problems, the present invention uses a novel "angioplasty" approach to rerouting circuits. First, using, for example, the provisioning server 20*a*, a defined path which does not include the hot, congested trunk is set up. Then, a dummy circuit is set up between the two endpoints of the congested trunk while reserving substantially all of the residual bandwidth on the congested trunk. Next, the defined path is deleted so that a source switch can again take control of the circuit and determine a new path for it. Because the dummy circuit is saturating the congested trunk, the congested trunk is not selected when the source switch reroutes the circuit, thus preventing the circuit from going back to the hot trunk.

To reduce operational overhead, circuits may be rerouted (for example, by the provisioning server 20*a*) in a batch mode, the number of circuits in a batch depending on the number of defined paths that a source switch or line card can support. Typically, the disruption to user data caused by such rerouting is negligible; the process is no different than inherent virtual load balancing which reroutes circuits during normal network operations without a user's knowledge.

Exemplary Evaluation by a Network Operator

After rerouting, an operator may measure the new level(s) of congestion and cell loss on the affected circuits. Because such measurements target the number of links/circuits that were congested, and because the number of links/circuits is relatively small, these measurements can be made without any significant impact on a network's load.

Having discussed the techniques provided by the present invention, we now turn to a more detailed discussion of some examples of hardware (e.g., devices), firmware or software (sometimes collectively referred to as a "platform") that may be used to carry out such techniques.

In an embodiment of the present invention, one or more of the techniques of the present invention may be carried out using a flexible and modular platform architecture. For example, the present invention may be carried out using a wide range of Windows platforms, including a laptop that includes a 1.0 GHZ Pentium III processor with 128 MB of memory.

In one embodiment of the present invention, the "front end" of such a platform/processor may be implemented using Visual Basic and Excel macros to collect the data needed to carry out the present invention. It may also include a spreadsheet interface.

Figure 3:
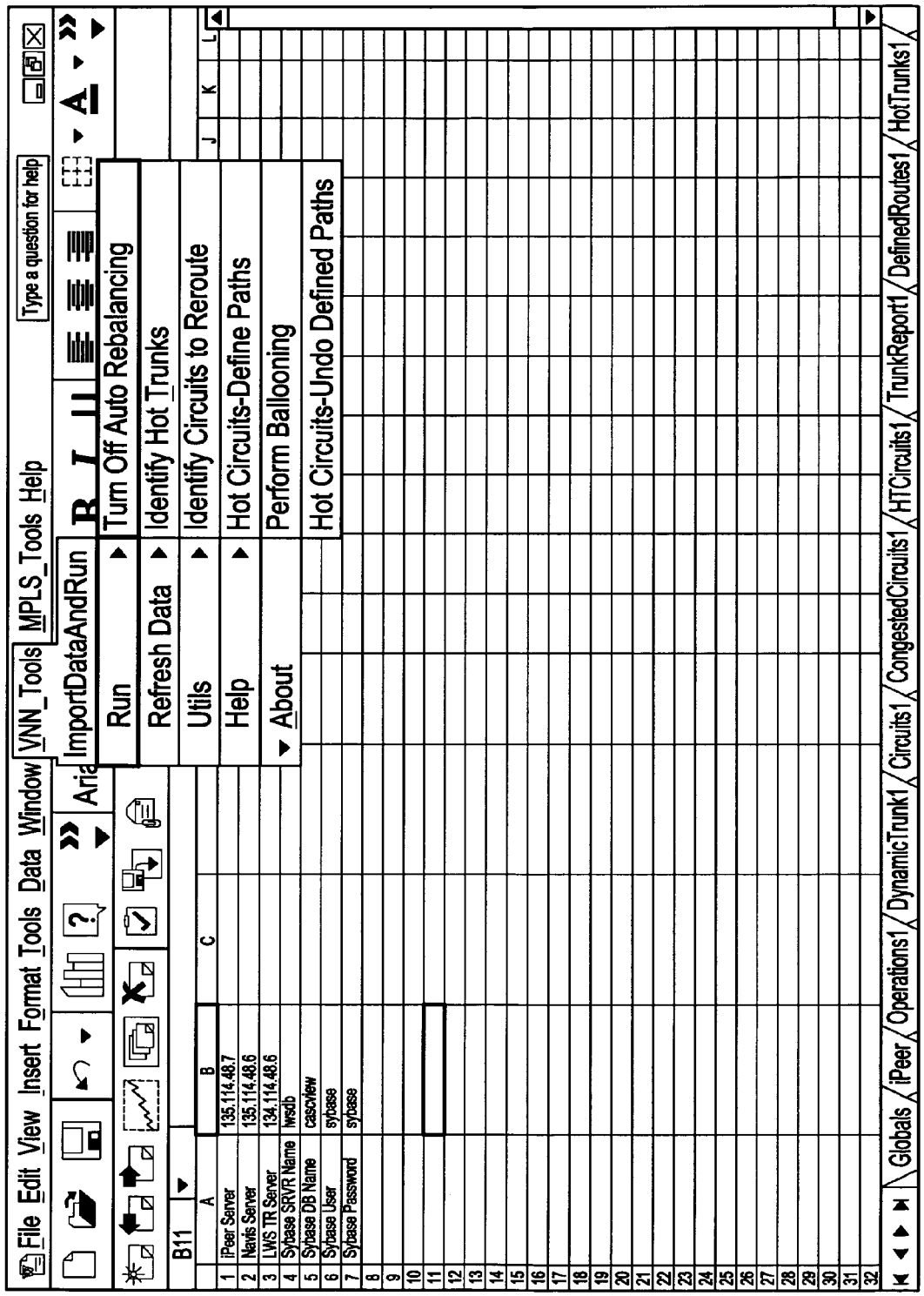
FIG. 3 depicts exemplary menus within a platform that may be used to carry out features and functions of the present invention.

Data entered by a user, data collected from a network, and the recommendations generated may be recorded in Excel sheets, as may be the changes that are eventually implemented. FIG. 3 depicts some menus that may be used in a platform operable to carry out techniques of the present invention.

Systems and platforms provided by the present invention may include various software interfaces. These interfaces may be used by an optimization server (and other elements shown in FIG. 2) to exchange data. Examples of such interfaces include: an open database connectivity (ODBC) interface (for accessing static network data from the database server) and Hypertext Transport Protocol (HTTP)/Extensible Markup Language (XML) interfaces for acquiring real-time network information via a peering server and static and dynamic trunk information from an HTTP server hosting a web server trunk tool. The systems and platforms provided by the present invention may also include an interface to a provisioning server to implement any recommendations.

In a further embodiment of the present invention, a so-called "back end" of a processor, system or platform of the present invention may be operable to identify and compute the recommendations to alleviate congestion. These programs may take the form of C++ language-based programs or the like.

It should be further understood that the front-end and/or back-end may be realized in hardware, software, firmware or some combination of the three. For example, one or more programmable processors that store one or more programs may be used to carry out the features and functions of the front end or back end.

We now present a more detailed description of the present invention.

Exemplary Congestion Detection and Analysis

In general, congestion detection may be based on the following three methods.

A peering or optimization server may be operable to first collect traffic demand and network topology information from an NMS. In some networks, such information is stored in a database management server. Traffic demand information may include circuit endpoints, circuit type, QoS class, and rate (e.g., peak cell rate and mean cell rate). Network topology information may include link endpoints, capacity, oversubscription factors, and other parameters. After collecting this information, an optimization server may simulate routing behavior and estimate the data traffic load on each link. It may be assumed that the average data rate of traffic on CBR and VBR circuits is the reserved rate, while the average data rate of traffic on UBR circuits is configurable by network operators. Links on which the data rate exceeds the total capacity by a certain configurable percentage are considered congested.

In a second method, an optimization server may be operable to examine the available bandwidth information advertised by a virtual network routing protocol. (This information may be collected from a peering server.) Low available bandwidth indicates possible congestion.

In yet a third method, an optimization server may be operable to examine the number of VCs on each link. (This information can be obtained from a trunk-information reporting tool or from SNMP queries of switches.) A high number of VCs indicates possible congestion.

It should be noted that the first method has the lowest operational cost, while the third method has the highest because the first method involves querying a centralized database, while the third method involves exchanging SNMP messages with each switch.

The second method only introduces one link state update to the network and passively receives information from only one peering server, is not as intrusive to the network as the third method, and it reduces server and trunk set-up time and costs.

Because of the dynamics of virtual network routing, the estimates on which the first method is based may not always be accurate. For example, if the simulation process does not take into consideration the time it takes to set up a circuit, there may be discrepancies between the simulated paths and the actual paths that circuits take. More importantly, the first method assumes that UBR circuits exhibit uniform behavior. This means that the same aggregate rate may be realized by putting the same number of circuits together. In other words, under the assumption that all UBR connections are alike (each of them carries the same amount of data) the aggregate amount of traffic carried by any fixed number (say n) of them will be the same irrespective of which particular n connections are picked. Even though all UBR connections may not always be alike, if the number of connections n picked is large enough (say in the 100s) then this condition is likely to hold.

The second method generates real-time available link bandwidth data with a potential error as great as 10 percent of link capacity due to the nature of existing virtual network routing advertisement algorithms. Changes in link bandwidth triggers a new trunk LSA (Link State Advertisement) only if the change is greater than 10 percent of the total link capacity for the corresponding QoS class or if the 30-minute LSA refresh timer expires.

The third method may produce an accurate total VC count without knowing the VC count for each QoS class; however, it does not provide information on how much bandwidth is reserved for the VCs.

None of the methods just discussed can determine with certainty that congestion exists on a link or that user data is being dropped on a link because none of them directly measures data rate. To obtain accurate data rate measurements—if such measurements are even possible—would probably involve expensive MIB polling from many (or all) switches. However, by combining all three methods (i.e., by combining the likelihood of congestion obtained from each method), the present invention identifies congestion points with reasonable certainty.

In one embodiment of the present invention, an optimization server may be operable to generate a list of congested trunks. In addition, such a server may be further operable to generate a list of candidate circuits that can be moved off each hot trunk to relieve congestion. To generate the list, the server may be first operable to obtain a list of the circuits on each congested link through bulk data transfer, which is provided by virtual network routing. This list should, by and large, match the list that simulations would generate. In other words, the set of circuits obtained from the network and the set of circuits calculated using simulations should be substantially the same. Next, an optimization server may be operable to pick a subset of UBR circuits from among those that match to ensure that the eventual rerouting of a circuit to a less congested path eliminates or reduces congestion on this link and does not create a new congested link. The absence of a new, congested link may be ensured by simulating virtual network routing again, this time under the assumption that it is possible to block some links artificially by setting up balloons or dummy circuits on them so that they will not be used during the next iteration of virtual routing. Finally, an optimization server may generate a list of candidate circuits to be rerouted, together with the new paths planned for these circuits and a list of links to be ballooned. The list of candidate circuits to be rerouted may be arranged in an order determined by the advantages/disadvantages of moving each of the circuits. This is ascertained by considering the number of congested trunks through which the circuit is currently going and the congestion that will be created when the circuit is rerouted to its new path.

In accordance with a further embodiment of the present invention, an optimization server may be operable to select the next best circuit to reroute using a so-called greedy heuristic process.

Circuit Rerouting

When a network operator decides to perform optimization based on the list of circuits that an optimization server generates, in accordance with yet another embodiment of the present invention, those circuits may be rerouted in a non-disruptive manner by a provisioning server or the like. Before the optimization process begins, a network operator may want to measure the actual congestion of the circuits on a list and remove those circuits whose congestion level is/are within some tolerance threshold.

In an embodiment of the present invention, an optimization server is operable to begin the rerouting process by first disabling the rebalancing algorithms built into most network elements (e.g., switches) in order to prevent internal, virtual network rebalancing from interfering with the optimization process.

An optimization server is then operable to reroute one or more circuits on the list away from congested links by setting the defined path for each circuit in the list. It does this by sending commands, along with circuit identification and defined path information, to a provisioning server. As a result, the circuits are pinned (explicitly routed) on the defined paths. Note that in a virtual routing network, there is a set limit on the maximum number of circuits with defined paths that may exist simultaneously on each interface card; for example, one switch may have a limit of 100 circuits. So, to reroute all of the circuits may require more than one step. That is, multiple iterations involving defining a path, ballooning, and un-defining a path may be required. One advantage of such an iterative process is that a network operator may be able to observe the optimization process closely and may be able to stop and reverse it if an unpredicted event occurs.

Ballooning

Once an optimization server has rerouted a set of circuits off a congested trunk, it may be further operable to set up a dummy PVC between the two ends of the trunk to fill up the bandwidth on a control plane. The dummy PVC is not used for data transmission, but just for filling up the trunk's bandwidth. One issue is that, in order to set up the dummy PVC, a source switch has to realize that bandwidth is available in both directions as a result of the rerouting that may have just occurred. However, if the change is below 10 percent of the total capacity link, it may take up to 30 minutes for a switch to send out a refresh LSA to inform other switches of a change in bandwidth. Therefore, in a further embodiment of the present invention, an NMS or provisioning server may be operable to trigger an immediate generation of an LSA by "flipping" the trunk administrative cost (e.g., setting the cost to an original value minus one and then setting it back to the original value). It should be noted that changing an administrative cost:

Triggers an immediate LSA update;
Is a non-disruptive operation for most switches; and
Cannot be used on switches with old software versions that do not support non-disruptive administrative cost changes.

There are two main reasons why it is not advisable to optimize routing by adjusting administrative costs, rather than by ballooning and selective re-routing:

Techniques based on administrative cost changes often require changing the administrative cost on many switches across a network, creating significant dynamics in both control and data planes; and
Switches with older software versions often do not support non-disruptive administrative cost changes.

This has a limited impact on a ballooning approach, because, in the worst case, it is possible to exclude those trunks with at least one interface on a switch with older software and optimize only those with higher software versions.

It is a more serious problem for a method based on administrative cost changes alone, because rerouting depends on the correct setting of all the administrative costs.

In a ballooning process in accordance with an embodiment of the present invention, an optimization server is operable to perform the following four steps:

1. Commands are sent to a provisioning server to reduce the trunk administrative cost by one.
2. An SNMP query is used to get available bandwidth information for both directions of a trunk on which it intends to put a dummy PVC (i.e., a balloon).
3. A one-hop dummy PVCs is set up (i.e., balloons) on links through a provisioning server, with the required bandwidth equal to the bandwidth available on a link.
4. A command is sent to the provisioning server to increase the trunk administrative cost by one (i.e., back to its original value).

Note that steps 1 and 4 both trigger an LSA update. The need for step 4 will be explained below.

Undefined Paths

In this step, an optimization server or the like in conjunction with a provisioning server deletes the defined paths again. Because of the potential for delay in LSA updates, the same issue that affects ballooning exists here; namely, if a source switch of a circuit does not realize that a congested trunk is currently out of bandwidth because of the balloon, it may attempt to route the circuit back to this trunk. Although such rerouting will fail because the switch that owns the congested trunk will reject it, the attempt will cause unnecessary signaling overhead in the network. It is for this reason that the present invention delays setting administrative costs back to their original values until step 4, immediately before it deletes the defined paths.

It is possible that, after the paths have been undefined, circuits may not stay on the same paths as predicted by simulations. For example, when multiple equal cost paths are available, virtual routing and an optimization process may choose different paths. Therefore, rerouting may cause some other trunks to be loaded unexpectedly. To address this issue, the present invention (e.g., an optimization server) is operable to wait, for example, for 30 minutes, to allow all switches to send refresh LSAs across the network. This enables an optimization server to be in sync with the available bandwidth on all trunks through the peering server. Once it is in sync, optimization/provisioning servers again perform congestion detection, circuit rerouting, ballooning, and un-defining paths to reroute the next set of circuits. The process is repeated until there is no more congestion.

As a final step, an NMS, for example, may be operable to adjust the administrative cost of each ballooned trunk (e.g., lower it by one) and, when the entire procedure has been completed, rebalances all the switches. Note that the administrative cost of a ballooned trunk is lowered for a different purpose in this step: to ensure that (virtual routing) rebalancing does not move existing non-dummy circuits for which there are multiple, equal cost shortest paths out of the ballooned link before the administrative cost has been lowered.

All the above steps can be repeated when it again becomes necessary to monitor, and optimize, network routing. Each time the procedure is repeated, old balloons may be changed or removed in accordance with new network conditions and new balloons may be inserted.

Simulations

The present inventors carried out simulations of the present invention using the network shown in FIG. 1. The simulations were carried out in a lab environment.

The parameters for the exemplary network of FIG. 1 were selected to reflect those of actual service provider networks to the extent possible. Table I shows the configuration of an exemplary trunk. The first two columns contain the identifiers of the end switches of a given trunk. The third column contains the administrative cost of the trunk and the last two columns contain the oversubscription used on the trunk for UBR traffic in each direction. The values were chosen to be symmetric in the two directions. For the sake of simplicity, only QoS types CBR and UBR were assumed for the provisioned circuits. Note that the trunks are not oversubscribed for CBR traffic. The DS3 and OC3 trunks have, respectively, 38,000 Kb/s and 119,000 Kb/s available for data traffic after taking into account such things as management overhead.

TABLE I

| AEndSwitch | ZEndSwitch | Admin cost | AEndUBROverSub % | ZEndUBROverSub % |
|---|---|---|---|---|
| 1.1 | 1.2 | 100 | 500 | 500 |
| 1.2 | 1.3 | 100 | 100 | 100 |
| 1.4 | 1.1 | 300 | 100 | 100 |
| 1.6 | 1.1 | 1000 | 100 | 100 |
| 1.5 | 1.6 | 400 | 100 | 100 |
| 1.7 | 1.6 | 100 | 100 | 100 |
| 1.1 | 1.3 | 150 | 600 | 600 |
| 1.2 | 1.4 | 100 | 100 | 100 |
| 1.5 | 1.3 | 1000 | 500 | 500 |
| 1.5 | 1.7 | 99 | 500 | 500 |
| 1.1 | 1.3 | 150 | 100 | 100 |

It was further assumed that circuits are provisioned only between switches 1.1 and 1.4. Note that, for given trunk administrative costs, the shortest path between these two nodes includes a hop via node 1.2, because the cost of the direct trunk between these two nodes is 300, while the cost of the one-hop path is 200. Thus, initially, all of the circuits provisioned between these two nodes will go over the one-hop path as long as both the links on this path are able to reserve resources for the provisioned path. When the one-hop path is not able to support a circuit, that circuit may be routed over the direct link between 1.1 and 1.4, because the direct link is the second shortest path between these two nodes.

It was further assumed that the circuits between the two nodes were provisioned in the following order:

1. 20 CBR circuits, each with a PCR (Peak Cell Rate) of 2048 cells/sec or 848 Kb/s in each direction,
2. 214 UBR circuits, and
3. 22 CBR circuits, each with a PCR of 2048 cells/sec or 848 Kb/s in each direction.

Each UBR circuit was assumed to require a minimum available bandwidth (taking into account oversubscription) of 100 cells/sec. Thus, on the trunk connecting switches 1.1 and 1.2, each UBR circuit will reserve 100/5=20 cells/sec of physical bandwidth, because it is oversubscribed by 500 percent for UBR traffic. The total bandwidth required by all the UBR circuits on this trunk is therefore 214*20=4280 cells/sec=1772 Kb/s. On the trunk connecting switches 1.4 and 1.2, the total bandwidth required by all the UBR circuits is 1772*5=8860 Kb/s. The CBR circuits require a total bandwidth of 42*848=35,616 Kb/s on each of the trunks. Thus, all of these circuits may be routed on the one-hop shortest path.

Suppose that each UBR circuit is a DSL service with an average sustained rate of 50 Kb/s. Then, because the CBR circuits run at their PCRs, the total data traffic for these circuits is 42*848+214*50=46,316 Kb/s. This results in congestion on the DS3 trunk connecting switches 1.1 and 1.2, resulting in observed cell losses of up to 30 percent. A specialized piece of equipment [i.e., SmartBits] was used to generate artificial ATM cell data and measure cell loss on the circuits.

Given the trunk in Table I, methods and systems (including platforms and processors, etc.) provided by the present invention first detected and analyzed the congestion on the trunk connecting switches 1.1 and 1.2. Recommendations were generated suggesting approximately 200 UBR circuits should be moved off the one-hop path to the direct trunk connecting switches 1.4 and 1.2. When allowed to do so, these circuits were moved in about 10 minutes, after turning off (i.e., disabling) rebalancing in the network. During the move, there was no significant LSA activity and the CBR circuits remained healthy. After the move, methods and systems provided by the present invention filled up the available bandwidth on the trunk connecting switches 1.1 and 1.2 with a balloon (i.e., a dummy circuit) so that no new circuits could be provisioned on this trunk and the circuits that were moved would not be rebalanced back to it. Finally, methods and systems provided by the present invention activated rebalancing. The network was observed to be in a stable state with no cell losses or congestion on any trunk.

We claim:

1. A method for alleviating congestion in a connection-oriented network comprising:
    simulating the network's online routing of data offline;
    identifying one or more congested trunks from the simulations; and
    saturating one or more of the congested trunks with traffic using one or more dummy circuits to ensure that the one or more congested trunks are not used to re-route traffic;
    setting up a defined path away from one of the congested trunks for each circuit in a list of candidate circuits;
    setting up one of the dummy circuits between end points of the congested trunk associated with the defined pathway while reserving substantially all of a residual bandwidth on the congested trunk; and
    deleting the defined path.

2. The method as in claim 1 further comprising collecting data from control and management sections of the network.

3. The method as in claim 1 further comprising identifying one or more circuits of an identified congested trunk to reroute to a part of the network that has spare capacity to alleviate congestion.

4. The method as in claim 1 wherein the network comprises a frame relay asynchronous transfer mode network.

5. The method as in claim 1 wherein the network comprises an Multi-Protocol Label Switching (MPLS) network.

6. The method as in claim 3 further comprising rerouting one or more circuits of an identified congested trunk to a part of the network that has spare capacity to alleviate congestion.

7. The method as in claim 6 further comprising identifying the one or more trunks to reroute and a rerouting order based on a greedy heuristic process.

8. The method as in claim 7 wherein the greedy heuristic process ranks circuits based on how effective the circuits are in alleviating congestion.

9. The method as in claim 7 further comprising rerouting identified circuits in a batch mode.

10. The method as in claim 2 wherein the collected data comprises network-state and traffic-demand information.

11. The method as in claim 1 further comprising:
disabling rebalancing of elements within the network;
rerouting one or more circuits of an identified congested trunk; and
activating rebalancing.

12. The method as in claim 11 further comprising adjusting an administrative cost of a dummy circuit.

13. A system for alleviating congestion in a connection-oriented network comprising:
an optimization server operable to
simulate the network's online routing of data offline,
identify one or more congested trunks from the simulations, and
saturate one or more of the congested trunks with traffic using one or more dummy circuits to ensure that the one or more congested trunks are not used to re-route traffic; and
a provisioning server operable to
set up a defined path away from one of the congested trunks for each circuit in a list of candidate circuits,
set up one of the dummy circuits between end points of the congested trunk associated with the defined pathway while reserving substantially all of a residual bandwidth on the congested trunk, and
delete the defined path.

14. The system as in claim 13 wherein the provisioning server is further operable to collect data from control and management sections of a network.

15. The system as in claim 13 wherein the optimization server is further operable to identify one or more circuits of an identified congested trunk to reroute to a part of the network that has spare capacity to alleviate congestion.

16. The system as in claim 13 wherein the network comprises a frame relay asynchronous transfer mode network.

17. The system as in claim 13 wherein the network comprises an MPLS network.

18. The system as in claim 15 wherein the provisioning server is further operable to reroute one or more circuits of an identified congested trunk to a part of the network that has spare capacity to alleviate congestion.

19. The system as in claim 13 wherein the optimization server is further operable to identify one or more trunks to reroute and a rerouting order based on a greedy heuristic process.

20. The system as in claim 19 wherein the optimization server is further operable to rank circuits based on how effective the circuits are in alleviating congestion.

21. The system as in claim 19 wherein the provisioning server is further operable to reroute identified circuits in a batch mode.

22. The system as in claim 14 wherein the collected data comprises network-state and traffic-demand information.

23. The system as in claim 13 further comprising a network management system (NMS) operable to:
disable rebalancing of elements within the network;
reroute one or more circuits of an identified congested trunk; and
activate rebalancing.

24. The system as in claim 23 wherein the NMS is further operable to adjust an administrative cost of a dummy circuit.

25. The system as in claim 24 further comprising one or more platforms, wherein one of the platforms comprises a back-end platform that includes one or more C++ programs.

* * * * *